2,809,953

MODIFIED PHENOL-FORMALDEHYDE RESIN COMPOSITIONS AND PROCESS OF SIZING GLASS SURFACE THEREWITH

Jesse Werner, Holliswood, N. Y., Robert Steckler, Russell, Ohio, and Frederick A. Hessel, Upper Montclair, N. J., assignors to General Aniline & Film Corporation, New York, N. Y., a corporation of Delaware No Drawing. Application November 18, 1955,
Serial No. 547,827

12 Claims. (Cl. 260—43)

The present invention relates to thermosetting compositions comprising a mixture of a phenol-formaldehyde resin and a N-vinylpyrrolidone polymer having improved adhesion to glass and fibrous glass material.

Various polymers and copolymers have been suggested as bonding agents for glass cloth, glass fibers, glass mats, roving, and the like. Polymers of allyl esters of saturated and unsaturated dibasic acids have been employed in the preparation of Fiberglas laminates and glass reinforced plastic objects. Blends of diallyl esters copolymerized with another mono-functional or poly-functional vinyl monomer have yielded a wide variety of cross-linked copolymers which have been suggested as reinforcing or bonding agents for glass laminates. The principal disadvantage of such polymers and copolymers, when employed as a laminating agent, is that the resulting cured polymer or copolymer has poor adhesion to glass cloth, glass fibers, glass mats, and the like. If glass cloth, mats or glass fibers are impregnated with such polymers and copolymers and built into laminates followed by final curing, the laminates do not exhibit their optimum properties such as flexural strength and modulus of elasticity.

Phenol-formaldehyde resins although having many desirable properties, have certain inherent drawbacks which prevent their full commercial use as reinforcing resins for laminating purposes. Processing conditions for phenol-formaldehyde resins are critical and minor variations from the optimum conditions result in inferior and unusable laminates. However, even under the most carefully controlled conditions, the resulting laminates have low flexural strengths and a low modulus, both wet and dry. Phenol-formaldehyde resin laminates are brittle and are so lacking in adhesion that up to the present time they have been rarely used in commercial laminating applications.

It is an object of this invention to overcome the foregoing difficulties and to provide new modified phenol-formaldehyde resin compositions having excellent adhesion to various types of glass materials, while still maintaining excellent water insensitivity.

Another object is to provide processes for preparing compositions of phenol-formaldehyde resins modified with a polymer or copolymer of N-vinylpyrrolidone and glass material, such as fibers, strands, mats, cloth, flakes, and other glass materials.

Other objects and advantages will become more clearly apparent from the following specification.

We have found that phenol-formaldehyde resins are successfully modified to yield excellent adhesion to glass, glass fibers, strands, mats, cloth, and other glass materials by employing a mixture containing from 80 to 97% by weight of a phenol-formaldehyde resin and from 20 to 3% by weight of a polymer of N-vinylpyrrolidone. By the latter term we include homopolymers of vinylpyrrolidone and copolymers with other polymerizable vinyl monomers. Such a resin mixture may be used not only as a laminating agent between two sheets or mats of glass, but may be used by itself as an unsupported film with glass included in its composition as a reinforcing agent. Its use as a laminating agent yields excellent structural compositions, which also have the advantage of an inexpensive phenol-formaldehyde resin. Despite the fact that the modified phenol-formaldehyde composition may contain as much as 20% of a N-vinylpyrrolidone either in the form of a polymer or copolymer, the resulting laminates and films, even after prolonged water immersion, display tenacious adhesion to glass, and with no apparent leaching.

The mixture of phenol-formaldehyde resin and polymer or copolymer of N-vinylpyrrolidone may be prepared in several ways. For example, if a phenol-formaldehyde solid molding powder is used, part of the powder may be replaced by solid polymer or copolymer of N-vinylpyrrolidone in the aforestated percent weight ratios. If an aqueous dispersion or a solution of a phenol-formaldehyde resin is used aqueous solutions of a polymer or copolymer of N-vinylpyrrolidone may be added to form the mixture. The solutions are so adjusted that they contain a solid or resin content in the aforestated percent weight ratios. The phenol-formaldehyde resin may be used in aqueous solution to which an aqueous solution of the polymer or copolymer of N-vinylpyrrolidone may be added to form the mixture. Powdered phenol-formaldehyde resin may be mixed with powdered polymer or copolymer of N-vinylpyrrolidone.

A mixture of the reaction product of N-vinylpyrrolidone and formaldehyde, in solid or solution form, may be blended with the solid or solution of the phenol-formaldehyde resin to yield thermosetting compositions having improved adhesion to glass and fibrous glass materials. Compositions obtained by co-reacting N-vinylpyrrolidone with phenol-formaldehyde resin in solution can also be employed to yield excellent adhesion to glass and glass fibers. It is also possible to employ compositions obtained by the addition of N-vinylpyrrolidone during the initial condensation of phenol with formaldehyde.

The polymers of N-vinylpyrrolidone which may be employed in admixture with the phenol-formaldehyde resin are characterized by the following general formula:

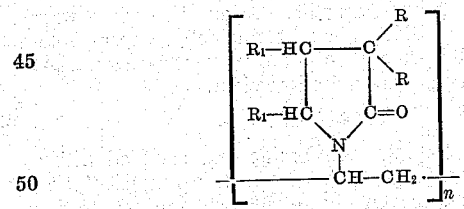

wherein R and R₁ represent either hydrogen, methyl or ethyl groups, and $n$ represents a number indicative of the extent of polymerization. The number of recurring polymer units indicated by "$n$" usually corresponds to a chain of 192 to 980 monomer units.

As illustrations of the monomers which are employed in preparing the polymers and copolymers, the following may be mentioned:

N-vinyl-2-pyrrolidone
5-methyl-N-vinyl-2-pyrrolidone
5-ethyl-N-vinyl-2-pyrrolidone
3,3-dimethyl-N-vinyl-2-pyrrolidone
3-methyl-N-vinyl-2-pyrrolidone
4-methyl-N-vinyl-2-pyrrolidone
4-ethyl-N-vinyl-2-pyrrolidone All of the polymers of N-vinylpyrrolidone characterized by the foregoing general formula are commercially available, and are readily prepared by the procedural steps given in U. S. P. 2,265,450; 2,317,804 and 2,335,454, in which working examples of all the species characterized by the above formula are given.

The copolymers of N-vinylpyrrolidone with other polymerizable monomers include:

N-vinylpyrrolidone-vinyl acetate
N-vinylpyrrolidone-maleic anhydride
N-vinylpyrrolidone-diallyl phthalate
N-vinylpyrrolidone-acrylonitrile All of the aforementioned copolymers are readily prepared by following the methods given in the literature. The only restriction imposed upon such copolymers is that the vinylpyrrolidone content be at least 40%.

The phenol-formaldehyde resins employed in accordance with the present invention are readily available on the open market in various grades, i. e. in solution and in powdered form, and both types may be employed in the preparation of resinous compositions having improved adhesion to glass and fibrous glass materials. The procedures for preparing such phenol-formaldehyde resins are also well known to those skilled in the art, and references to literature need not be made herein. However, for purposes of illustration, a procedure which yields a phenol-formaldehyde resin as a molding powder which may be used in the course of the present invention is as follows:

To a 3-neck resin flask, equipped with stirrer, thermometer and reflux condenser, were added 1.0 mole of phenol, 0.9 mole of formaldehyde (37% aqueous solution) and 2.0% of oxalic acid based upon the weight of the phenol. The mixture was heated with stirring to 60° C. over a 15 minute period. At this point an exothermic reaction begins. Heating is discontinued, and the temperature rises to reflux 96° C. in about 10 minutes. Heat is then reapplied, and the temperature held at reflux for two hours. A creamy emulsion is obtained which is now dehydrated in vacuo. The temperature during dehydration is permitted to drop to 80° C. When the batch clears, the temperature is then slowly raised to 125° C. which is sufficient to remove unreacted phenol and oxalic acid. Stirring is continued at 125° C. until a removed sample is hard and clear and has a melting point of about 90–100° C. The resin is then poured into a pan while hot, then cooled to room temperature, crushed and pulverized. The powdered resin is then blended with 10 parts hexamethylenetetramine per hundred parts resin powder until a uniform mixture is obtained.

The following examples will illustrate the various ways in which the modified phenol-formaldehyde resin compositions of the present invention may be prepared and employed: All parts given are by weight.

EXAMPLE I

A sheet of Fiberglas reinforcing mat (bonded with a thermosetting polyester resin) was cut into three 5″ x 5″ pieces and the pieces gently fluffed to permit penetration of the molding powder prepared as above. The glass mat and phenol-formaldehyde resin molding powder were then placed in a closed container in the ratio of 75 parts of molding powder and 25 parts of glass mat. The container was then shaken gently in order to uniformly distribute the powder throughout the glass. The coated glass was then placed in a matched metal die, heated to 250° F. and 50 p. s. i. pressure applied immediately. The mold temperature was raised to 320° F. during 10 minutes and the pressure was kept at 50 p. s. i. for an additional 10 minutes. The mold was then cooled to about 150° F. and the resulting 5″ x 5″ x ⅛″ sheet removed from the mold.

The laminates obtained were very uniform and subjected to physical tests, the results of which are shown in Table 1.

EXAMPLE II

Example I was repeated with the exception that 5% by weight of the phenol-formaldehyde molding powder was replaced by 5% by weight of polyvinylpyrrolidone powder having a K value of 30.

EXAMPLE III

Example I was again repeated with the exception that 10% by weight of the phenol-formaldehyde molding powder was replaced by 10% by weight of the polyvinylpyrrolidone powder having a K value of 30.

EXAMPLE IV

Example I was again repeated with the exception that 15% by weight of the phenol-formaldehyde molding powder was replaced by 15% by weight of polyvinylpyrrolidone powder having a K value of 30.

EXAMPLE V

Example I was again repeated with the exception that 20% by weight of the phenol-formaldehyde molding powder was replaced by 20% by weight of the polyvinylpyrrolidone powder having a K value of 30.

EXAMPLE VI

Example I was again repeated with the exception that 30% by weight of the phenol-formaldehyde molding powder was replaced by 30% by weight of the polyvinylpyrrolidone powder having a K value of 30.

EXAMPLE VII

Example I was again repeated with the exception that 15% by weight of the phenol-formaldehyde molding powder was replaced by 15% by weight of a copolymer of vinylpyrrolidone-acrylonitrile in which the pyrrolidone content was 75%.

The results of the physical tests of Examples I to VII inclusive are shown in Table 1.

EXAMPLE VIII

A Fiberglas mat (No. 219), polyester bonded, was cut into 6—5″ x 5″ pieces and the pieces gently fluffed or pulled apart to permit penetration of the phenolic molding powder as prepared above. The glass mats and the molding powder were then placed in a closed container in a ratio of 15 parts of phenol-formaldehyde molding powder and 15% parts of glass mat. The container was then gently shaken to uniformly distribute the molding powder throughout the glass mat. The coated glass was then placed in a mold preheated to 330° F., and 3000 lbs. pressure applied. After two minutes, the pressure was raised to 10,000 lbs. for a total cure of 15 minutes. The resulting 5″ x 5″ x ⅛″ sheet was then removed from the mold. The laminates obtained were uniform and subjected to physical tests, the results of which are shown in Table 2.

EXAMPLE IX

Example VIII was repeated with the exception that 5% by weight of the phenolic molding powder was replaced by 5% by weight of polyvinylpyrrolidone powder having a K value of 25.

EXAMPLE X

Example VIII was again repeated with the exception that 10% by weight of the phenol-formaldehyde molding powder was replaced by 10% by weight of polyvinylpyrrolidone powder having a K value of 30.

EXAMPLE XI

Example VIII was again repeated with the exception that 15% by weight of the phenol-formaldehyde molding powder was replaced by 15% by weight of polyvinylpyrrolidone powder having a K value of 26.

EXAMPLE XII

Example VIII was again repeated with the exception that 20% by weight of the phenol-formaldehyde molding powder was replaced by 20% by weight of the polyvinylpyrrolidone powder having a K value of 32.

EXAMPLE XIII

Example VIII was again repeated with the exception that 30% by weight of the phenol-formaldehyde molding powder was replaced by 30% by weight of the polyvinylpyrrolidone powder having a K value of 25.

EXAMPLE XIV

Example VIII was again repeated with the exception that 15% by weight of the phenol-formaldehyde molding powder was replaced by 15% by weight of a copolymer of vinylpyrrolidone acrylonitrile in which the vinylpyrrolidone content was 75%.

The results of the physical tests of Examples VIII to XIV inclusive are shown in Table 2.

It is to be understood that by the term "polymer of N-vinylpyrrolidone" as employed in the appended claims we include not only the polymers but also copolymers of vinylpyrrolidone and other polymerizable monomers in which the N-vinylpyrrolidone content ranges from 40 to 95% by weight.

By the term K value as employed in the foregoing examples, we mean the viscosity coefficient, K, which is fully described in Modern Plastics, 23, No. 3, 157–61, 212, 214, 216, 218 (1945) is calculated as follows:

$$\frac{\log \eta \text{ rel}}{C} = \frac{75 K^2}{1 + 1.5 \text{ kc}} + K$$

where C is the concentration in grams per 100 cc. of polymer solution and $\eta$ rel is the ratio of the viscosity of the solution to that of pure solvent. The K values are reported as 1000 times the calculated viscosity coefficient in order to avoid the use of decimals. For the purpose of the present invention, we may employ those polymers having a K value of 10 to 100, preferably of 30 to 100 because of their viscosity at lower concentrations.

from 20 to 3% by weight of a resinous material selected from the class consisting of homopolymers and copolymers of N-vinylpyrrolidone in which the N-vinylpyrrolidone has the following general formula:

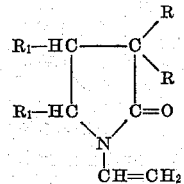

wherein R and $R_1$ represent a member selected from the class consisting of hydrogen, methyl and ethyl groups, the said copolymers containing 40 to 95% by weight of the said N-vinylpyrrolidone and from 60 to 5% by weight of an ethylenically unsaturated polymerizable monomer.

2. A composition of matter according to claim 1 wherein the N-vinylpyrrolidone of the homopolymer is N-vinyl-2-pyrrolidone.

3. A composition of matter according to claim 1 wherein the N-vinylpyrrolidone of the homopolymer is 3-methyl-N-vinyl-2-pyrrolidone.

4. A composition of matter according to claim 1 wherein the N-vinylpyrrolidone of the homopolymer is 3,3-dimethyl-N-vinyl-2-pyrrolidone.

5. A composition of matter according to claim 1 wherein the N-vinylpyrrolidone of the homopolymer is 4-methyl-N-vinyl-2-pyrrolidone.

6. A composition of matter according to claim 1 wherein the N-vinylpyrrolidone of the homopolymer is 5-methyl-N-vinyl-2-pyrrolidone.

7. The process of sizing a glass surface which comprises applying thereto a composition comprising a mixture of 80 to 97% by weight of phenol-formaldehyde resin and from 20 to 3% by weight of a resinous material selected from the class consisting of homopolymers and co-

*Table 1*

| | Parts Molding Powder | Parts Polymer or Copolymer of Polyvinyl-pyrrolidone | Flexural (Dry) ASTM D-790-49T | Modulus (Dry) ASTM D-790-49T | Resin/Glass |
|---|---|---|---|---|---|
| Phenol-Formaldehyde Resin of Example I | 100 | 0 | 17,200 | 800,000 | 75/25 |
| Resin Mixture of Example II | 95 | 5 polymer | 18,300 | 825,000 | 75/25 |
| Resin Mixture of Example III | 90 | 10 polymer | 19,200 | 870,000 | 75/25 |
| Resin Mixture of Example IV | 85 | 15 polymer | 19,100 | 970,000 | 75/25 |
| Resin Mixture of Example V | 80 | 20 polymer | 18,700 | 800,000 | 75/25 |
| Resin Mixture of Example VI | 70 | 30 polymer | 17,700 | 750,000 | 75/25 |
| Resin Mixture of Example VII | 85 | 15 copolymer | 19,120 | 970,000 | 75/25 |

*Table 2*

| | Parts Molding Powder | Parts Polymer or Copolymer of Polyvinyl-pyrrolidone | Flexural ASTM D-790-49T | Modulus ASTM D-790-49T | Resin/Glass | Tensil ASTM D-638-52T |
|---|---|---|---|---|---|---|
| Phenol-Formaldehyde Resin Mixture of Example VIII | 100 | 0 | Dry, 32,000 / Wet, 35,400 | Dry, 1,400,000 / Wet, 1,310,000 | 50/50 | Dry, 7,200. / Wet, 10,000. |
| Resin Mixture of Example IX | 95 | 5 polymer | Dry, 35,700 / Wet, 37,100 | Dry, 1,520,000 / Wet, 1,330,000 | 50/50 | Dry, 8,900. / Wet, 12,400. |
| Resin Mixture of Example X | 90 | 10 polymer | Dry, 37,900 / Wet, 41,900 | Dry, 1,730,000 / Wet, 1,370,000 | 50/50 | Dry, 12,200. / Wet, 15,700. |
| Resin Mixture of Example XI | 85 | 15 polymer | Dry, 37,100 / Wet, 40,600 | Dry, 1,650,000 / Wet, 1,350,000 | 50/50 | Dry, 12,000. / Wet, 15,000. |
| Resin Mixture of Example XII | 80 | 20 polymer | Dry, 35,700 / Wet, 40,000 | Dry, 1,550,000 / Wet, 1,340,000 | 50/50 | Dry, 11,900. / Wet, 14,400. |
| Resin Mixture of Example XIII | 70 | 30 polymer | Dry, 31,900 / Wet, 38,100 | Dry, 1,350,000 / Wet, 1,330,000 | 50/50 | Dry, 10,500. / Wet, 12,700. |
| Resin Mixture of Example XIV | 85 | 15 copolymer | Dry, 36,400 / Wet, 40,500 | Dry, 1,600,000 / Wet, 1,370,000 | 50/50 | Dry, 12,100. / Wet, 15,600. |

We claim:

1. A composition of matter comprising a mixture of 80 to 97% by weight of phenol-formaldehyde resin and polymers of N-vinylpyrrolidone in which the N-vinylpyrrolidone has the following general formula:

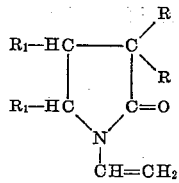

wherein R and $R_1$ represent a member selected from the class consisting of hydrogen, methyl and ethyl groups, the said copolymers containing 40 to 95% by weight of the said N-vinylpyrrolidone and from 60 to 5% by weight of an ethylenically unsaturated polymerizable monomer.

8. The process according to claim 7 wherein the N-vinylpyrrolidone of the homopolymer is N-vinyl-2-pyrrolidone.

9. The process according to claim 7 wherein the N-vinylpyrrolidone of the homopolymer is 3-methyl-N-vinyl-2-pyrrolidone.

10. The process according to claim 7 wherein the N-vinylpyrrolidone of the homopolymer is 3,3-dimethyl-N-vinyl-2-pyrrolidone.

11. The process according to claim 7 wherein the N-vinylpyrrolidone of the homopolymer is 4-methyl-N-vinyl-2-pyrrolidone.

12. The process according to claim 7 wherein the N-vinylpyrrolidone of the homopolymer is 5-methyl-N-vinyl-2-pyrrolidone.

References Cited in the file of this patent

UNITED STATES PATENTS

| | | |
|---|---|---|
| 1,831,462 | Moss | Nov. 10, 1931 |
| 2,667,473 | Morner et al. | Jan. 26, 1954 |